United States Patent [19]
Herbert

[11] Patent Number: 5,586,927
[45] Date of Patent: Dec. 24, 1996

[54] CONSTANT CONCENTRATION RINSEABLE SLURRY DEVICE

[75] Inventor: William G. Herbert, Williamson, N.Y.

[73] Assignee: Xerox Corporation, Stamford, Conn.

[21] Appl. No.: 351,100

[22] Filed: Nov. 30, 1994

[51] Int. Cl.$^6$ ..................................................... B24C 9/00
[52] U.S. Cl. ............................. 451/88; 451/36; 451/39; 451/44; 210/512.1
[58] Field of Search ............................ 451/82, 84, 87, 451/88, 36, 38, 39, 40, 99; 210/767, 248, 512.1, 521; 137/546, 590.6

[56] References Cited

U.S. PATENT DOCUMENTS

| | | | |
|---|---|---|---|
| 3,237,351 | 3/1966 | Millhiser | 451/40 |
| 4,250,024 | 2/1981 | Soares et al. | 451/88 |
| 4,275,531 | 6/1981 | Van Fossen | 451/88 |
| 5,049,260 | 9/1991 | Spears | 451/88 |
| 5,182,882 | 2/1993 | Brodene et al. | 451/36 |
| 5,332,643 | 7/1994 | Harada et al. | 451/39 |
| 5,456,838 | 10/1995 | Heggertveit | 210/512.1 |

FOREIGN PATENT DOCUMENTS

| | | | |
|---|---|---|---|
| 5250091 | 4/1977 | Japan | 451/99 |

*Primary Examiner*—Bruce M. Kisliuk
*Assistant Examiner*—George Nguyen
*Attorney, Agent, or Firm*—Finnegan, Henderson, Farabow, Garrett & Dunner

[57] ABSTRACT

In a honing system for producing a light-scattering surface on a photoreceptor substrate for use in xerographic printers, a constant concentration maintenance device is employed to drain an appropriate amount of liquid from a honing slurry to match the amount of liquid added during rinsing of the photoreceptor substrate. The constant concentration maintenance device is mechanically effected by vibrations in the mixing apparatus of the honing system, facilitating separation of the liquid an solid parts of the slurry. Delay between honing and rinsing is eliminated through use of the same honing booth for both operations.

9 Claims, 2 Drawing Sheets

CONSTANT CONCENTRATION RINSEABLE SLURRY DEVICE

BACKGROUND OF THE INVENTION

The present invention relates to a honing device for treating the surface of photoreceptors used in xerographic printers. In particular, the invention relates to a device for maintaining the concentration of a honing slurry during rinsing of a photoreceptor substrate.

Xerographic printers, such as laser printers, employ a cylindrical photoreceptor, analogous to the film in a camera, having a charged surface. Monochromatic laser light is used to selectively discharge areas of the photoreceptor surface. That surface is then exposed to toner or dry ink which is attracted to either charged or discharged portions of the surface, depending on the system used. The toner or dry ink is then transferred to paper.

The high reflectivity of the cylindrical photoreceptor surface causes a defect known as "plywood." The high reflectivity causes improper reflection of laser light, resulting in unintentional discharges on the surface of the photoreceptor. These unintentional discharges form a pattern resembling the grain of plywood. (See, e.g., U.S. Pat. No. 5,215,853.) To protect against the undesirable light reflections causing plywood, photoreceptors are fabricated with a light-scattering surface. One method of creating such a surface is honing. (See, e.g., U.S. Pat. No. 5,096,792.)

In honing, the cylindrical photoreceptor substrate is placed in a honing booth and sprayed uniformly with a slurry of a liquid, often water, and solid particles or beads, often glass. The forcible spray dulls the surface of the photoreceptor, forming a light-scattering surface. The honing operation itself, however, may produce defects affecting print quality.

For reasons which are not entirely known, during the honing process, some glass beads penetrate the surface further than others and become lodged in the surface. If not removed, these glass beads prevent proper charging or discharging of the photoreceptor surface in the neighborhood of the impacted glass bead, resulting in black spots or deletions in print depending on the system used.

Usually a rinsing operation is performed after honing to rinse away remaining glass beads. It has been determined, however, that even a short delay in rinsing following honing causes a significant increase in the number of glass beads remaining embedded after rinsing. That is, the number of permanent defects caused by embedded glass beads is directly related to the time delay between honing and rinsing. Delays on the order of 1½ to 2 minutes produce significant increases in, and an unacceptable number of defects.

The delay involved usually results from concern over adversely effecting the slurry concentration through introduction of the rinse liquid into the honing booth. Rinsing the photoreceptor substrate with water in the honing booth immediately following honing decreases the concentration of glass particles in the slurry because the rinse water is combined with the existing slurry, decreasing the particle to liquid ratio. Even slight changes in slurry concentration detrimentally effect subsequent honing operations. Yet removing the photoreceptor substrate from the honing booth before rinsing in order to protect against changes in slurry concentration introduces unacceptable delays prior to rinsing.

Previous methods of monitoring and maintaining slurry concentration while rinsing have been proposed using significant additional equipment and expense. For those reasons, close monitoring and adjustment of slurry concentration has proven undesirable.

SUMMARY OF THE INVENTION

Accordingly, the present invention is directed to a device which maintains slurry concentration during and after rinsing of photoreceptor substrates within the same honing booth. The principle advantage of the present invention is that it allows immediate rinsing of photoreceptor substrates following honing, virtually eliminating defects resulting from impacted particles. The device is also inexpensive, and can be readily added to existing honing booths.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages and in accordance with the purpose of the invention, as embodied and broadly described, the invention is a slurry separation device for use in a liquid honing system including a slurry containment tank having a bottom level, a slurry, and a drain, comprising a coiled tube having an upper end and a lower end, the lower end of the coil tube connected to the slurry containment tank to receive slurry, and the upper end connected to a drain and secured at a predetermined vertical level relative to the bottom level of the slurry containment tank.

It is to be understood that both the foregoing general description and the following detailed description are exemplary and explanatory, and are intended to provided further explanation of the invention as claimed.

BRIEF DESCRIPTION OF THE DRAWINGS

The accompanying drawings, which are incorporated in and constitute a part of this specification, illustrate two embodiments of the invention and, together with the description, serve to explain the objects, advantages, and principles of the invention.

In the drawings.

DETAILED DESCRIPTION OF THE PREFERRED EMBODIMENTS

Figure 1:
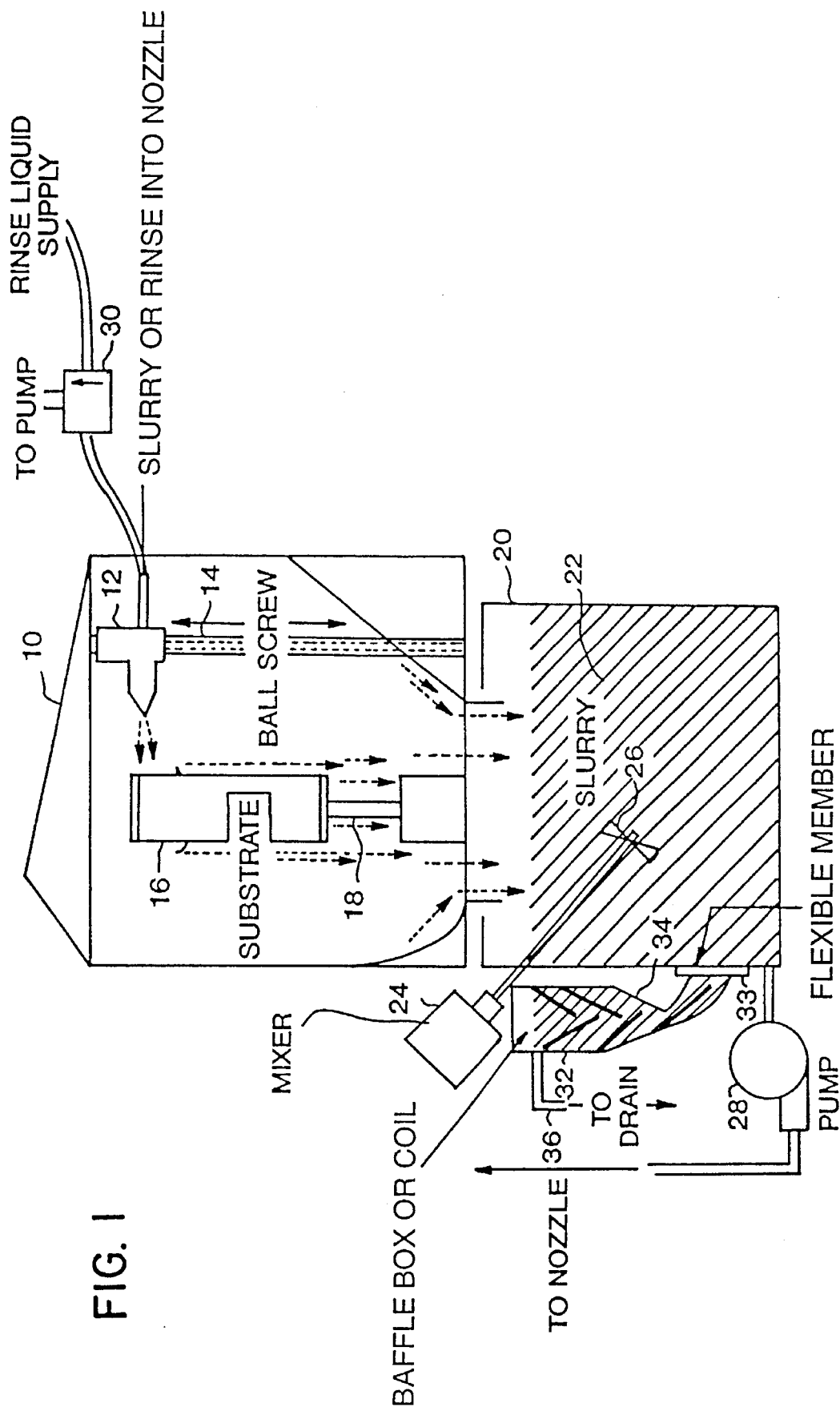
FIG. 1 is a schematic view of one embodiment of a honing system in accordance with the present invention.

A honing system in accordance with the present invention includes a containment booth which encloses apparatus for forcibly conducting a slurry and a rinse liquid against a substrate. An exemplary embodiment of the honing system of the present invention is shown in FIG. 1.

A containment booth 10 encloses a slurry or rinse liquid nozzle 12 used to spray the slurry or rinse liquid forcibly against the substrate. The nozzle 12 is movably mounted on a ball screw column 14, allowing the nozzle to spray the entire length of the substrate. Containment booth 10 also encloses the substrate 16, which is movably mounted on substrate mount 18. Substrate mount 18 rotates the substrate 16 in accordance with the movement of nozzle 12 along ball screw column 14 such that the entire surface of substrate 16 is sprayed with slurry or rinse liquid.

The honing system of the present invention also includes an amount of slurry contained within a slurry containment tank, and a slurry mixing apparatus. As shown in FIG. 1, the containment tank 20 is connected at the base of containment booth 10 to collect the sprayed slurry or rinse liquid. The sprayed slurry or rinse liquid enters the slurry 22 stored within the containment tank. Mixer motor 24 drives a mixing blade 26 to constantly agitate the slurry 22. Constant agitation of the slurry ensures a uniform concentration and prevents settling of the solid particles.

A pump 28, connected to the slurry containment tank 20, pumps slurry to the nozzle 12. The nozzle 12 is also alternately connected to an outside rinse liquid supply through valve 30. During honing, valve 30 directs slurry from pump 28 to the nozzle 12. During rinsing, valve 30 directs fluid from the rinse liquid supply to the nozzle 12.

In an alternative embodiment, separate nozzles could be used for delivering slurry and rinse liquid. Moreover, the pump 28 could be used to pump either slurry or rinse liquid from the rinse liquid supply to a nozzle 12 or dual nozzles.

Finally, the honing system of the present invention includes a device for separating the liquid from the solid of the slurry. In the embodiment illustrated in FIG. 1, this separation apparatus takes the form of a baffle box 32 connected to the slurry containment tank 20. The baffle box 32 includes baffles 34 and is ultimately connected to a drain 36. The baffle box is connected to the containment tank via flexible member 33 to facilitate vibration. In operation, slurry from the containment tank enters the baffle box and is substantially shielded from the mixing motion of mixer blade 26 because of, and provided an arduous path through baffles 34. Solid particles within the slurry in the baffle box are thus allowed to settle out of the mixture. The baffle box is mechanically connected to the mixing apparatus to provide vibration and facilitate return of the solid particles to the containment tank for mixing. Liquid at the very top of the baffle box-at the drain level-is substantially free of solid particles and is drained off.

When neither honing nor rinsing is taking place, all of the slurry in the system collects in the slurry containment tank 20. The level of the slurry is determined by the vertical position of the drain connected to the baffle box relative to the bottom of the slurry containment tank. A steady-state level of slurry is maintained in accordance with the level of the drain.

During honing with the slurry, the same amount of slurry is removed from the slurry containment tank via pump 28 as is sprayed at the substrate 16 by nozzle 12 and collected back into the slurry containment tank 20. Thus no increase in slurry level occurs.

During rinsing, however, rinse liquid is introduced into the system via nozzle 12, and is collected by the slurry containment tank. The steady-state level of slurry is maintained, however, because the rise in slurry level in the containment tank due to the added rinse liquid is exactly compensated for by the amount of liquid entering the drain from baffle box 32.

Because only the liquid component of the slurry is drained from the baffle box, the amount of total liquid and total solid is constant throughout the rinsing operation. Thus the concentration of solid in the liquid also remains constant.

Figure 2:
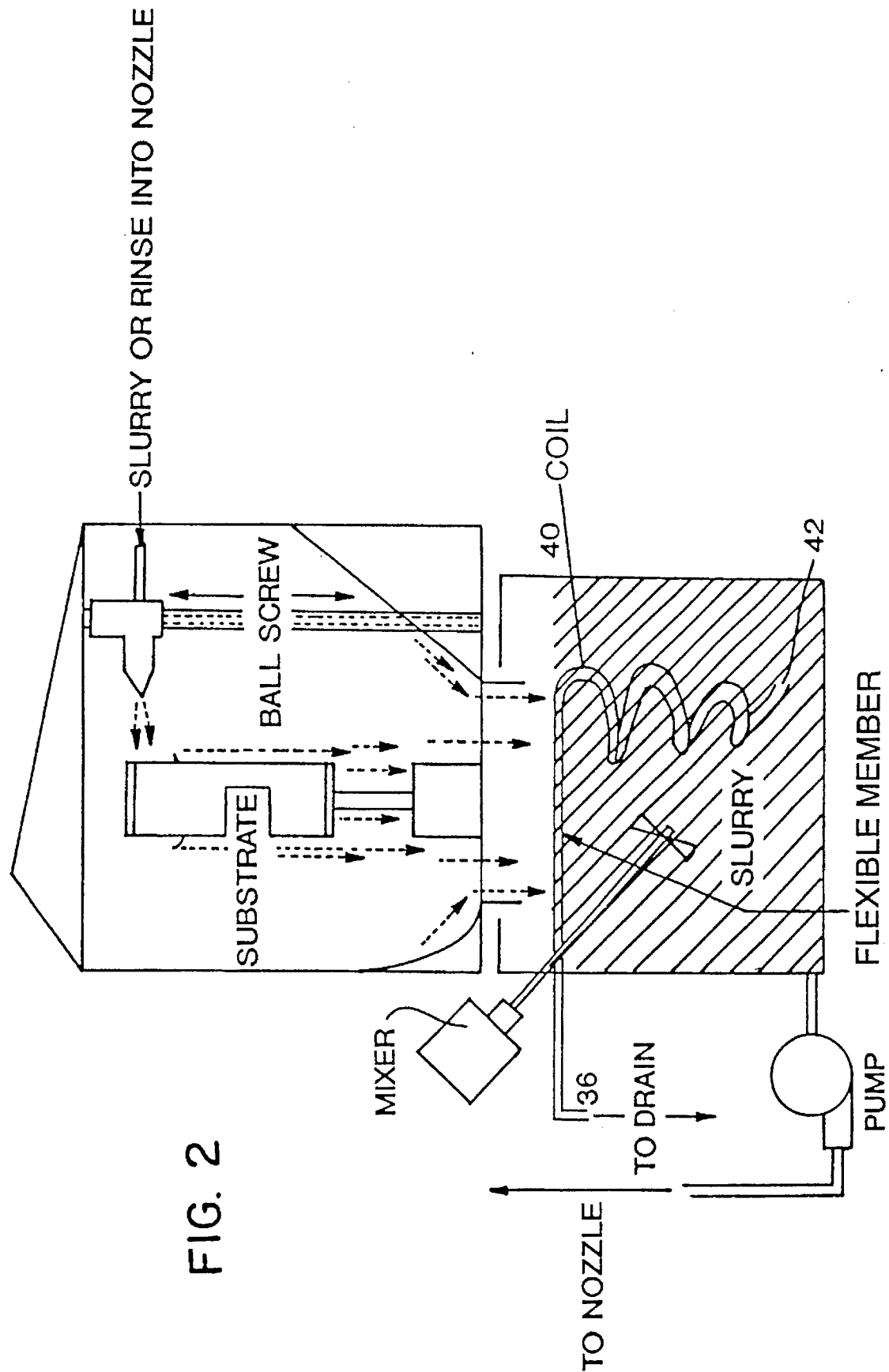
FIG. 2 is a schematic view of another embodiment of a honing system in accordance with the present invention.

In a second, preferred embodiment, a coiled tube is used in place of the baffle box 32 as a concentration maintenance device. FIG. 2 depicts a coiled tube 40 located inside the containment tank 20. Slurry enters the coiled tube 40 at the bottom end 42 and travels and arduous path through the coil to where the coiled tube attaches to drain 36. The coiled tube insulates the slurry within the coil from mixing by mixing blade 26, but because the tube is located inside the containment tank 20, the slurry within the coiled tube is subjected to vibrations resulting from the motion of mixing blade 26 and the surrounding slurry outside of the tube, facilitating separation of the solid from the liquid. In addition, a smooth inner surface of the coiled tube 40 aids in separation and reclamation of solid particles.

Various other embodiments are well within the scope of the present invention. For example, the coiled tube could be connected to, and located outside of, the containment tank 20 and mechanically attached to the mixing apparatus as with baffle box 32.

Thus it will be apparent to those skilled in the art that various modifications and variations can be made in the disclosed system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A honing system for a substrate comprising:

a slurry containment tank for retaining a slurry of a liquid and a solid, including an opening and a bottom, containing an amount of the slurry;

an independent source of the liquid;

means for mounting and moving the substrate;

means for forcibly conducting the slurry against the substrate, the slurry conducting means connected to the slurry containment tank to receive the slurry;

means for forcibly conducting the liquid against the substrate, the liquid conducting means connected to the independent source of the liquid to receive the liquid;

a containment booth connected to the opening of the slurry containment tank, enclosing the slurry conducting means, the liquid conducting means, and the substrate;

means for mixing the slurry in the slurry containment tank:

a drain; and means for separating the liquid from the slurry contained in the slurry containment tank, wherein the separation means has an upper end and a lower end, the lower end is submerged in the slurry contained in the slurry containment tank, the upper end is secured at a predetermined vertical level relative to the vertical level of the bottom of the slurry containment tank, and the upper end is connected to the drain, wherein the separation means is structurally connected to the mixing means, causing the separation means to vibrate.

2. The honing system of claim 1, wherein the separation means comprises a coiled robe.

3. The honing system of claim 2, wherein an inner surface the coiled tube is substantially smooth, and the coiled tube tapers in diameter from the upper end to the lower end.

4. The honing system of claim 3, wherein the coiled tube is submerged in the slurry contained in the slurry containment tank up to the level of the upper end.

5. The honing system of claim 1, wherein the separation means comprises a baffle box, having a plurality of baffles connected to the interior of the baffle box, the baffle box being structurally connected to the mixing means.

6. A honing system for a substrate comprising:

a slurry containment tank for retaining a slurry of a liquid and a solid, including an opening and a bottom, containing an amount of the slurry;

an independent source of the liquid;

means for mounting and moving the substrate;

means for forcibly conducting the slurry against the substrate, the slurry conducting means connected to the slurry containment tank to receive the slurry;

means for forcibly conducting the liquid against the substrate, the liquid conducting means connected to the independent source of the liquid to receive the liquid;

a containment booth, connected to the opening of the slurry containment tank, enclosing the slurry conducting means, the liquid conducting means, and the substrate;

means for mixing the slurry in the slurry containment tank;

a drain;

means for separating the liquid from the slurry contained in the slurry containment tank wherein the separation means has an upper end and a lower end, the lower end is submerged in the slurry contained in the slurry containment tank, the upper end is secured at a predetermined vertical level relative to the vertical level of the bottom of the slurry containment tank, and the upper end is connected to the drain, wherein the separation means is submerged in the slurry contained in the slurry containment tank up to the level of the upper end; and wherein the mixing of the slurry by the mixing means causes the separation means to vibrate.

7. A slurry separation device for use in a liquid honing system including a slurry containment tank for retaining a slurry having a bottom level and a drain, comprising a coiled tube having an upper end and a lower end, the lower end of the coiled tube connected to the slurry containment tank to receive slurry, and the upper end connected to a drain and secured at a predetermined vertical level relative to the bottom level of the slurry containment tank.

8. The slurry separation device of claim 7, wherein the coiled tube has a substantially smooth inner surface, tapers in diameter from the upper end to the lower end, and is structurally connected to a source of vibration.

9. A honing system for honing a photoreceptor substrate comprising:

an independent source of water;

a slurry containment tank, including an opening and a bottom, for containing an amount of a slurry of water and a solid;

means for mounting and rotating the substrate;

means for selectively spraying the slurry and the water at the substrate, the spraying means connected to the slurry containment tank and to the independent source of water;

a containment booth, connected to the opening of the slurry containment tank, enclosing the spraying means and the substrate;

means for mixing the slurry in the slurry containment tank;

a drain; and means for separating the water from the slurry contained in the slurry containment tank, wherein the separation means comprises a coiled tube having an upper end and a lower end, the lower end submerged in the slurry contained in the slurry containment tank, the upper end is secured at a predetermined vertical level relative to the vertical level of the bottom of the slurry containment tank, and the upper end is connected to the drain.

* * * * *